(12) United States Patent
Becker

(10) Patent No.: US 6,237,312 B1
(45) Date of Patent: May 29, 2001

(54) CORN HEAD STRIPPER PLATE ADJUSTING MECHANISM

(75) Inventor: Aaron T. Becker, Cambridge, IL (US)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 09/411,887

(22) Filed: Oct. 4, 1999

(51) Int. Cl.[7] ................................. A01D 45/02
(52) U.S. Cl. ............................. 56/62; 56/119
(58) Field of Search ..................... 56/51, 59, 98, 56/62, 119, 64, 66, 93, 99, 327.1, 328.1, 76, 79, 80, 90, 105, 106

(56) References Cited

U.S. PATENT DOCUMENTS

| | | | |
|---|---|---|---|
| 5,060,464 | * 10/1991 | Caron | 56/62 |
| 5,680,750 | * 10/1997 | Stefl | 56/62 |
| 5,704,202 | * 1/1998 | Calmer | 56/106 |
| 5,881,541 | * 3/1999 | Silver et al. | 56/98 |

* cited by examiner

Primary Examiner—Robert E. Pezzuto
(74) Attorney, Agent, or Firm—Richard G. Lione; Brinks Hofer Gilson & Lione

(57) ABSTRACT

An adjusting mechanism for a stripper plate in a cornhead row unit includes two slots formed through the plate adjacent its outer edge. The slots define narrow plate segments from the outer edge. Arcuate surfaces are formed on inner and outer edges of the plate segments. An actuation arm associated with each slot has opposed fingers which engage a corresponding arcuate surface when the lever is manipulated to adjust the stripper plate position.

5 Claims, 5 Drawing Sheets

CORN HEAD STRIPPER PLATE ADJUSTING MECHANISM

FIELD OF THE INVENTION

The invention relates in general to agricultural combines. It relates particularly to a corn harvesting header assembly for an agricultural combine.

BACKGROUND OF THE INVENTION

A corn harvesting header assembly or cornhead for an agricultural combine typically comprises a series of row units which are identical to each other. Each row unit includes a pair of snapping rolls having a snapping slot formed between them. Gathering chains having gathering fingers guide corn stalks into the snapping slot. The snapping rolls pull the corn stalks through the snapping slot and the ears are removed from the stalks as they come into engagement with opposed edges of stripper plates which bracket the slot between the gathering chains and the snapping rolls.

It is conventional for at least one of the two stripper plates to be mounted on the row unit frame for movement toward and away from the other plate. This permits the gap between the opposed stripping edges to be varied to accommodate different corn crops and crop conditions. Adjustment of the gap is typically accomplished by an adjusting mechanism including an actuation lever coupled to the adjustable stripper plate.

Coupling arrangement in use today vary but, typically, a tradeoff is made between part cost and robust, i.e., rugged design characteristics. Rugged designs normally make for premium part costs but, of course, service life is increased. An example of a rugged actuation lever coupling arrangement presently in use is found in a corn harvesting header assembly produced by Deere & Company. In the Deere construction, a longitudinally extending rod is welded to the underside of the adjustable stripper plate. A forked end on the actuation lever cooperates with the rod in a lost motion relationship while maintaining line contact to smoothly move the adjustable stripper plate transversely and, accordingly, vary the gap between opposed stripping edges of the stripper plates.

Whether insufficiently rugged or too expensive, actuation lever adjusting mechanism and coupling arrangements in use today do not completely satisfy the customer—the farm operator. The mechanism of the present invention was developed to provide the farm operator with a rugged, yet simple and inexpensive solution.

SUMMARY OF THE INVENTION

It is an object of the present invention to provide an improved adjusting mechanism for the stripper plate in a cornhead row unit.

It is another object to provide an adjusting mechanism including a new and improved coupling arrangement that is both rugged and inexpensive.

It is still another object to provide a rugged coupling arrangement which does not require the use of components other than the stripper plate and actuator arm or arms.

The foregoing and other objects are realized in accord with the present invention by providing an adjustable stripper plate which is formed of steel plate. Two transversely extending slots are pierced through it, with one end of each adjacent the longitudinal outer edge of the plate. Each slot is separated by a narrow plate segment from the outer edge. An arcuate surface is formed on the outer longitudinal edge of the plate segment and an inner arcuate surface is formed on the inner longitudinal edge of the plate segment, i.e., in one end of the slot.

An adjusting lever is pivotally mounted in the row unit frame below the stripper plate in alignment with each slot. Each lever has two spaced fingers at its upper end. The space between those fingers is slightly greater than the width of each narrow plate segment (between the inner and outer arcuate surfaces) in the stripper plate above it. The fingers of each lever bracket a narrow plate segment. When the levers are manipulated from below, the captive, narrow plate segments and, thus, the stripper plate are moved transversely on the frame to vary the gap between the stripping edges of the stripper plates. One or the other of the fingers in each lever engages a corresponding arcuate surface, depending upon whether the gap is being narrowed or widened. The operative finger makes line contact on the radius of the corresponding arcuate surface, resulting in a smooth adjustment of the stripper plate gap.

BRIEF DESCRIPTION OF THE DRAWINGS

The invention, including its construction and method of operations, is illustrated more or less diagrammatically in the drawings, in which.

DESCRIPTION OF THE PREFERRED EMBODIMENT

Figure 1:
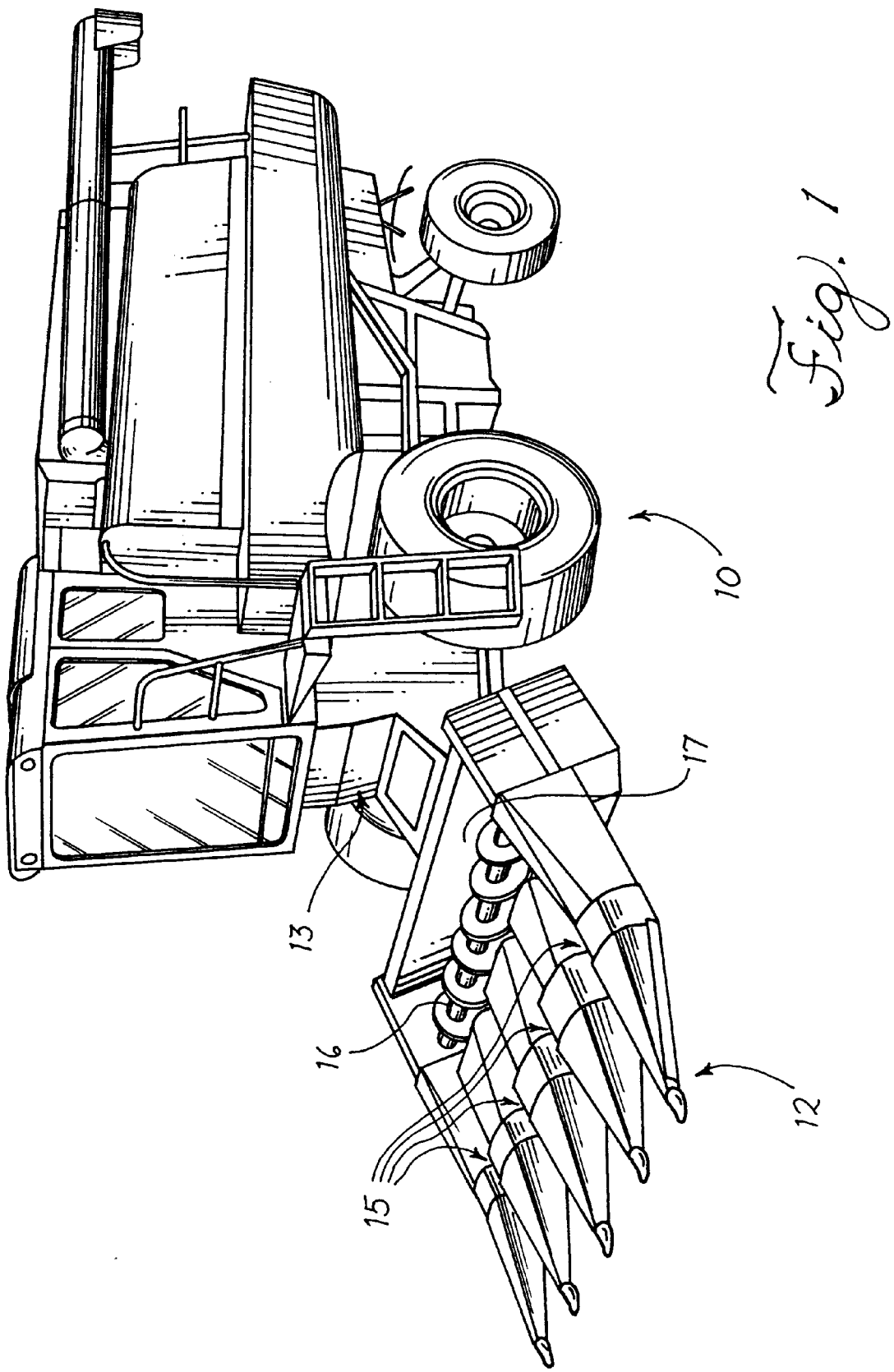
FIG. 1 is a front-side perspective view of an agricultural combine mounting a corn harvesting header assembly.

Referring now to the drawings, and particularly to FIG. 1, an agricultural combine of generally conventional construction is seen at 10. A corn harvesting header assembly or cornhead 12 is mounted on the combine 10, cantilevered in front of it and connected to the combine by a feeder assembly 13.

The header assembly 12 illustrated contains four row units 15, which harvest four rows of corn simultaneously. Ears of corn are stripped from each of the four rows by a row unit 15 and then carried by an auger 16 in the trough 17 of the header assembly 12 to the feeder assembly 13. The feeder assembly 13 carries the collected ears rearwardly and upwardly into a threshing assembly (not shown) in the body of the combine 10.

Figure 2:
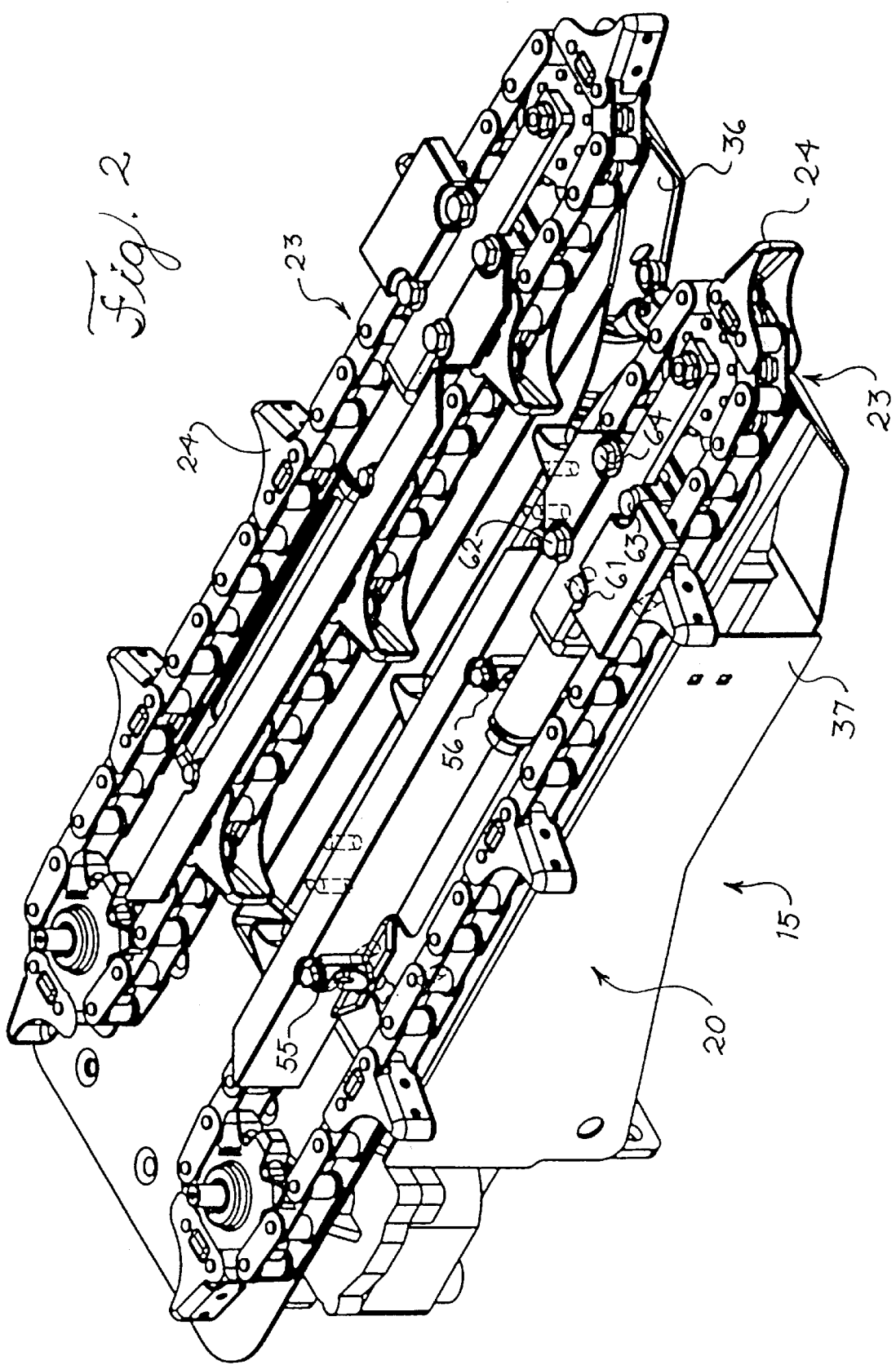
FIG. 2 is a front-side perspective view of a row unit in the corn harvesting header assembly of FIG. 1, the row unit incorporating a stripper plate adjustment mechanism embodying features of the present invention.
Figure 3:
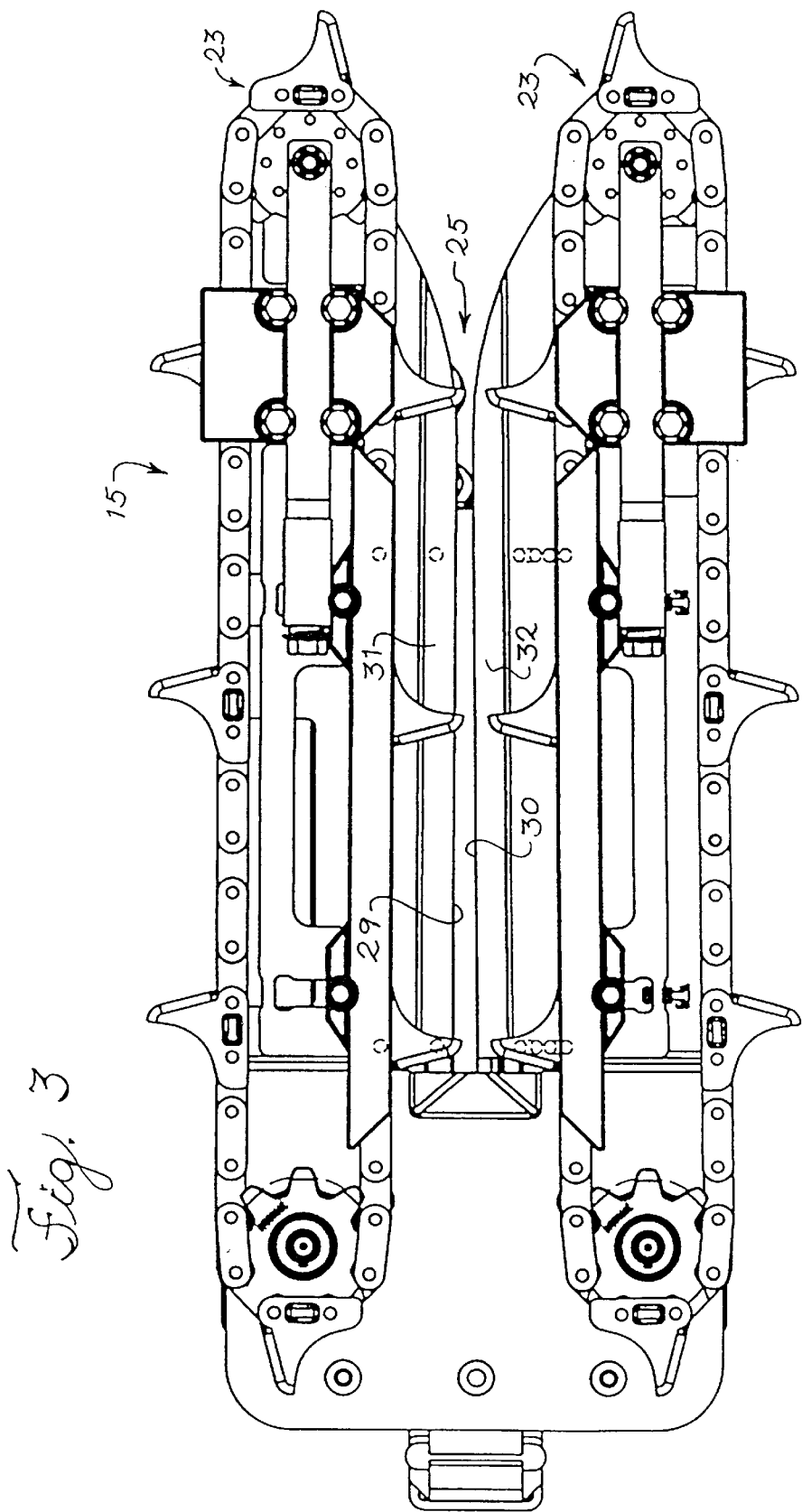
FIG. 3 is a top plan view of the row unit seen in FIG. 2.

Referring now also to FIGS. 2 and 3, a row unit 15 is shown removed from the header assembly 12. The row unit 15 gathers corn stalks into it as it moves forwardly along a row of corn.

Each row unit 15 includes a U-shaped frame 20 on which a pair of gathering chain assemblies 23 are mounted for endless circulation in paths parallel to each other. The gathering chain assemblies 23, each of which includes a series of gathering fingers 24, are designed to draw the stalks into a gap 25 defined between the opposed edges 29 and 30 of stripper plates 31 and 32, respectively. Snapping rolls (not shown) beneath the stripper plates 31 and 32 pull the corn stalks downwardly through the gap 25 and the ears of corn are stripped off of the stalks by the plates edges 29 and 30 as the stalks are pulled downwardly between them.

The gathering fingers 24 carry the stripped ears of corn rearwardly into to the trough 17. There they are deposited and conveyed by the augur 16 to the feeder assembly 13. The stripped corn stalks are pulled through the row unit 15 as it moves on through the field and are left in the field.

The stripper plates 31 and 32 are substantially identical in plan configuration. Their opposed edged 29 and 30, respectively, define the gap 25. The stripper plate 31 is bolted in fixed relationship on the left side section 36 (facing forward) of the U-shaped frame 20. The other stripper plate 32 is mounted on the right side section 37 of the frame 20 in a manner which allows for transverse movement toward and away from the plate 31.

Figure 4:
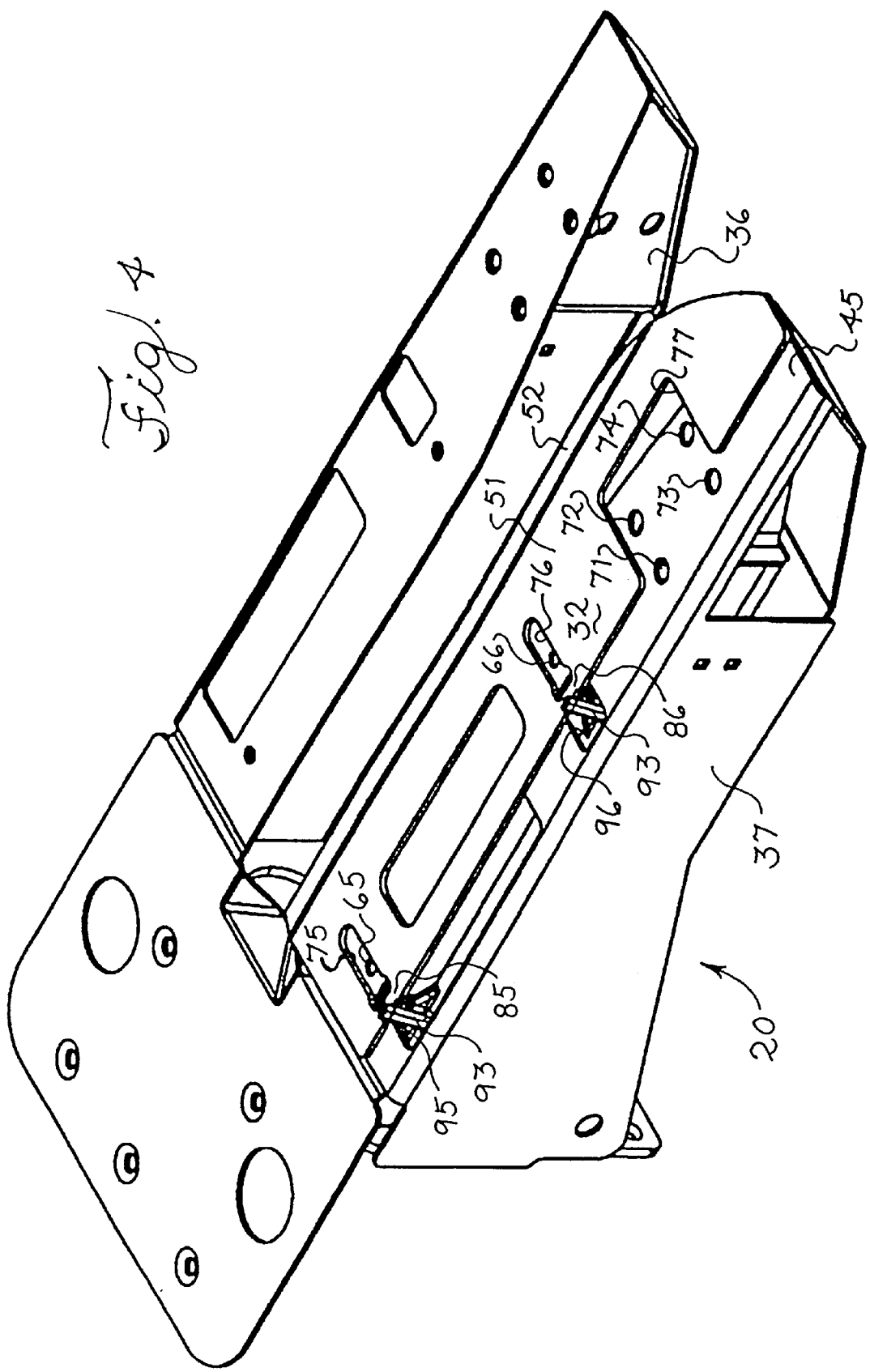
FIG. 4 is a perspective view similar to FIG. 2 showing the row unit frame and adjustable stripper plate arrangement, with the snapping rolls and gathering chains and their drive elements removed.
Figure 5:
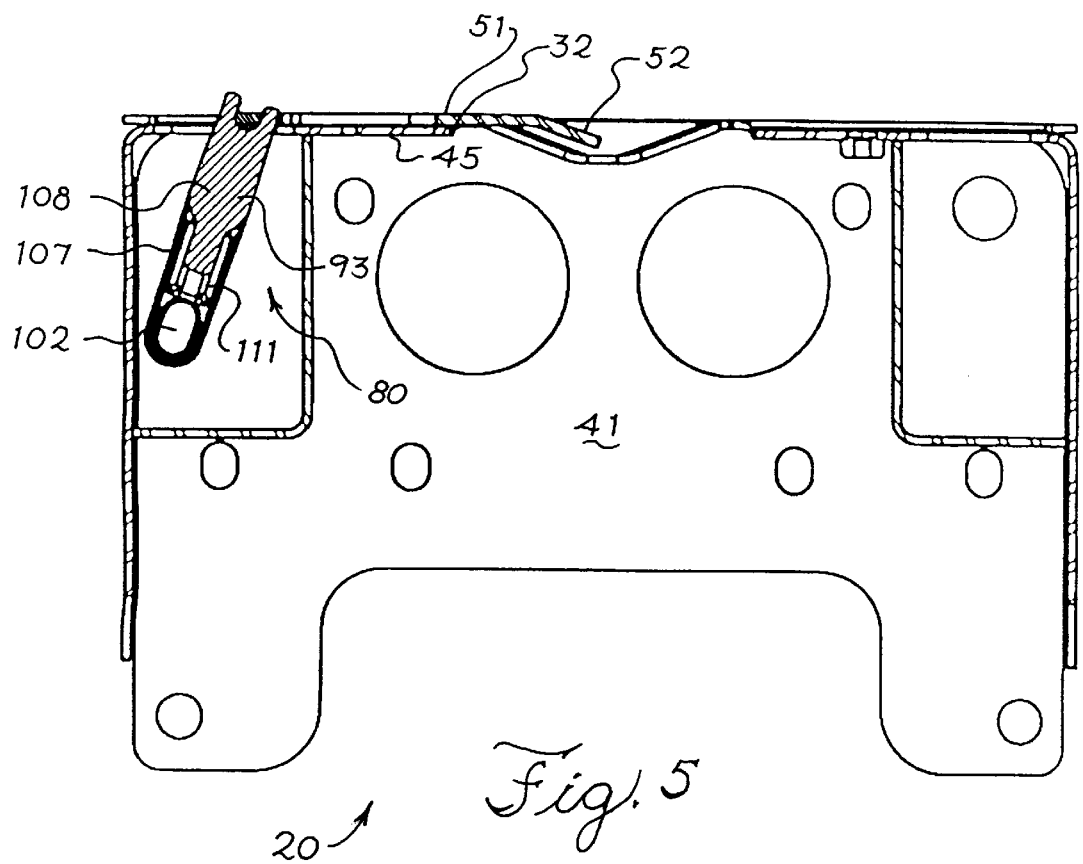
FIG. 5 is an enlarged sectional view taken along line 5—5 of FIG. 4.
Figure 6:
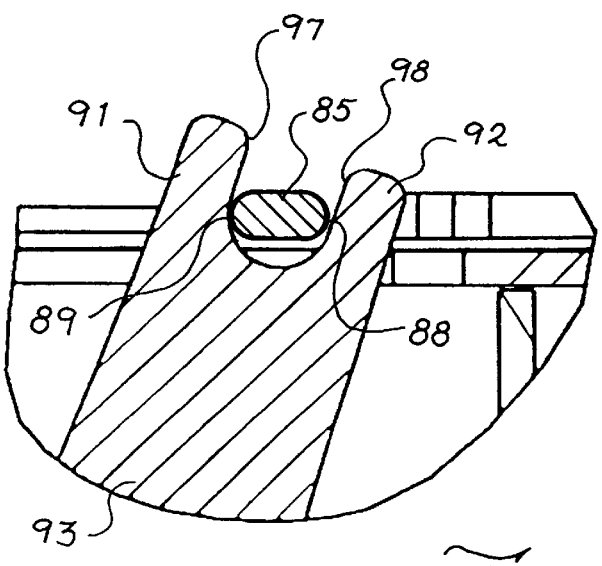
FIG. 6 is an enlarged, detail view of a portion of FIG. 5.

Referring now to FIGS. 4–6, the frame 20 is shown with the stripper plate 32 mounted on its right side section 37, and other components removed. The frame side sections 36 and 37 are identical to each other, although in mirror image construction, i.e., they oppose each other, but only the right side section 37 will be described in explaining the construction and operation of the present invention.

The right side section 37 of the frame 20 includes a ceiling plate 45 on which the stripper plate 32 is slidably mounted. The ceiling plate 45 is horizontal and flat. The stripper plate 32 includes a longitudinally extending, horizontal panel 51 which rests on the top plate 45. It also includes a longitudinally extending, downwardly inclined panel 52 disposed inwardly of the plate 45. The stripper plate edge 30 defines the innermost edge of this inclined panel 52.

The stripper plate 32 is held loosely against the top plate 45 by the chain guide and idler assembly 48 for the chain assembly 23 above it. In this regard, the corresponding gathering chain assembly 23 is fastened to the frame section 37 with a pair of longitudinally spaced bolts 55, 56 (see FIG. 2) and group of four bolts 61, 62, 63 and 64 spaced forwardly of the pair of bolts 55, 56.

Referring specifically to FIG. 4, the bolts 55, 56 are received in corresponding threaded apertures 65, 66 in the roof plate 45. The bolts 61, 62, 63, 64 are received in corresponding threaded apertures 71, 72, 73 and 74 in the top plate 45.

The bolts 55, 56 pass through transversely elongated slots 75 and 76 in the stripper plate 32. The bolts 61, 62, 63 and 64 press through a transversely extending cut-out 77 in the stripper plate 32. The chain assembly 23 is fixed at a position slightly above the stripper plate 32 by spacers (not shown) on the bolts 55, 56 and 61, 62, 63 and 64. Thus, the stripper plate 32 is securely held on the top plate 45 of the frame section 37 but free to slide toward and away from the stripper plate 31.

Sliding movement of the stripper plate 32 in the aforedescribed manner is effected and controlled by an adjusting mechanism 80 embodying features of the present invention. The adjusting mechanism 80 is best understood by referring to FIGS. 5 and 6, in addition to FIG. 4.

The adjustment mechanism 80 includes a pair of longitudinally extending plate segments 85 and 86 which form the outer extremities of the slots 75 and 76, respectively, in the panel 51 of the stripper plate 32. Each of the plate segments 85 and 86 is approximately 10 mm wide, and they are identical in construction. Accordingly, corresponding reference numerals are applied to each, and a description of the segment 85 suffices to an understanding of both segments 85 and 86.

The plate segment 85 has longitudinally extending inner and outer edges 88 and 89, respectively. The outer edge 89 forms part of the longitudinally extending outer edge of the stripper plate 32. The edges 88 and 89 are formed (during stripper plate 32 forming) into arcuate surfaces with constant radii of 5 mm about a longitudinal axis bisecting the segment 85. In this regard, the preferred plate 32 thickness is 4 mm.

The plate segment 85 is bracketed by the upwardly extending fingers 91 and 92 of an adjusting arm 93 which protrudes through a corresponding aperture 95 formed through the top plate 45 of the frame section 37. The opposed inner surfaces 97, 98 of each finger 91 and 92 are flat, and spaced slightly more than 10 mm from each other. The plate segment 86 is bracketed by the upwardly extending fingers of an identical adjusting arm 93, which protrudes through a corresponding aperture 96.

Each arm 93 is mounted on the same longitudinally extending-actuator shaft 102, and extends radially upwardly from that shaft. The shaft 102 is journaled at its rear end in the back plate 41 of the frame 20 and at its front end in a journal plate (not shown) mounted inside the side section 37 of the frame 20. Rotation of the shaft 102 in one direction or the other causes the corresponding finger surfaces 97 or 98 of both arms 93 to engage the opposed arcuate edge surfaces 88 or 89 of the plate segments 85 and 86 and move the plate 32 toward or away from the plate 31.

Each of the actuating arms 93 comprises a lower sleeve section 107 and an upper finger section 108, the latter being slidably seated in the sleeve section. The sleeve section 107 is rigidly fastened to the shaft 102 at its base 109. Above the shaft, within the sleeve section 107, a coil spring 111 biases the finger section 108 outwardly. It will thus be seen that when the shaft 102 is rotated to cause the arms 93 to turn and move the stripper plate 32, the arms will extend or retract as the distance between the plate segments and the shaft 102 shortens or lengthens.

As finger section 108 of each arm 93 rotates, its operative surface 97 or 98 maintains continuous line contact with the corresponding arcuate surface 88 or 89 on the plate segments 85 and 86. Smooth movement of the stripper plate 32 is effected to either narrow or widen the gap 25.

The invention has been described in the context of adjusting the position of a single stripper plate 32 in each row unit 15. However, it might also be applied to the other stripper plate 31, making both of them adjustable. Also, the stripper plate 32 has been described as having its edge 30 formed on a downwardly inclined panel 52. However, the panel 52 could also be co-planar with the panel 51 (with the configuration of the plate 31 being identical).

While a preferred embodiment of the invention has been described, it should be understood that the invention is not so limited, and modifications may be made without departing from the invention. The scope of the invention is defined by the appended claims, and all devices that come within the meaning of the claims, either literally or by equivalence, are intended to be embraced therein.

What is claimed is:

1. In a cornhead row unit, including first and second longitudinally extending stripper plates mounted on a frame and having opposed stripping edges which define a gap between them, at least one of said stripper plates being adjustable transversely on said frame to vary the width of the gap, the improvement in a mechanism for adjusting said one stripper plate comprising:

a) apertures formed vertically through said one stripper plate at locations longitudinally displaced along said one stripper plate;

b) a first segment of said one plate defined by at least one of said apertures;

c) a second segment of said one plate defined by at least one of said apertures;

d) each of said plate segments having opposed inner and outer edges extending longitudinally in said one plate;

e) an actuator shaft mounted on said frame beneath said one stripper plate for rotation about a longitudinal axis;

f) first and second actuation arms extending radially from said actuator shaft;

g) each of said actuation arms having two opposed fingers thereon bracketing corresponding first and second plate segments;

h) rotation of said actuator shaft about its longitudinal axis causing one of said fingers on each arm to bear against a corresponding edge on a corresponding one of said first and second segments and adjust said one plate transversely on said frame.

2. The improvement in an adjusting mechanism of claim 1 further characterized in that:

a) each of said inner and outer edges of said one plate segment has an arcuate surface, the surface having a radius of curvature about an axis lying in the plane of said one plate segment.

3. The improvement in an adjusting mechanism of claim 2 further characterized in that:

a) each of said two fingers has a flat actuation surface formed on it;

b) each of said flat actuation surfaces being positioned to engage a corresponding arcuate surface.

4. The improvement in an adjusting mechanism of claim 1 further characterized in that:

a) said outer edges of said plate segments are substantially coextensive with an outer edge on said one stripper plate.

5. The improvement in an adjusting mechanism of claim 1 further characterized in that:

a) each of said arms includes an extendable segment elastically biased toward an extended position.

* * * * *